United States Patent
De Jager et al.

[15] 3,678,027
[45] July 18, 1972

[54] ADSORPTION COMPLEXES OF PEPTIDES HAVING ADRENOCORTICOTROPIC HORMONE ACTIVITY

[72] Inventors: Evert De Jager; Jan Daniel Herman Homan, both of Oss, Netherlands

[73] Assignee: Organon Inc., West Orange, N.J.

[22] Filed: June 30, 1967

[21] Appl. No.: 650,192

Related U.S. Application Data

[63] Continuation-in-part of Ser. No. 341,128, Jan. 29, 1964, abandoned.

[30] Foreign Application Priority Data

Feb. 15, 1963 Netherlands............................289,055

[52] U.S. Cl............................................260/112.5, 424/179
[51] Int. Cl. .................................A61k 17/16, C07c 103/52
[58] Field of Search................................260/112.5; 424/179

[56] References Cited

UNITED STATES PATENTS

| | | | |
|---|---|---|---|
| 2,734,016 | 2/1956 | Holtermann | 424/179 |
| 2,807,569 | 9/1957 | Homan et al. | 424/179 |
| 2,944,940 | 7/1960 | Fisher et al. | 424/179 |
| 3,228,839 | 1/1966 | Kappeler et al. | 424/179 |
| 3,228,926 | 1/1966 | Kappeler et al. | 260/112.5 |
| 3,228,927 | 1/1966 | Kappeler et al. | 260/112.5 |
| 3,243,345 | 3/1966 | De Jager | 424/179 |

Primary Examiner—Lewis Gotts
Assistant Examiner—Melvyn Kassenoff
Attorney—Hugo E. Weisberger

[57] ABSTRACT

An injectable preparation suitable for hormone therapy is provided by a suspension in an aqueous injectable vehicle of an adsorption complex of a salt, hydroxide or oxide of zinc, nickel, cobalt, copper or iron and a peptide having ACTH activity with an amino acid sequence of at least that of the first 19 and not more than that of the first 31 amino acid residues of the ACTH molecule, the amount of metal being between about 1 and 20 mg. per 100 U.S.P. units of peptide.

5 Claims, No Drawings

ADSORPTION COMPLEXES OF PEPTIDES HAVING ADRENOCORTICOTROPIC HORMONE ACTIVITY

CROSS-REFERENCE TO RELATED APPLICATION

This application is a continuation-in-part of application Ser. No. 341,128, filed Jan. 29, 1964, now abandoned.

BACKGROUND OF THE INVENTION

For many years past the adrenocorticotropic hormone (ACTH) has been isolated from the anterior pituitaries of mammals for the manufacture of drugs, whose favorable effect against certain diseases is generally known. In recent years there has been a rapid development of the methods of protein synthesis and various research workers have succeeded in synthesizing peptides with ACTH activity. As it has been found that only part of the ACTH molecule is essential for the characteristic effect on the adrenal, it may be generally expected that these synthetic peptides with ACTH activity will be used as a drug and that in course of time they may replace the ACTH from animal sources, an expensive starting material still obtainable on a relatively small scale. It is obvious, however, that the need of preparations with enhanced and prolonged activity will continue accordingly.

From the U.S. Pat. No. 2,807,569, ACTH preparations suitable for injection are known, in which the hormone is combined with one or more salts or one or more hydroxides or oxides of metals retarding the resorption of protein hormones, which compounds may form an insoluble or sparingly soluble complex with the ACTH at a pH of about 6 – 8. The U.S. Pat. No. 3,243,345 describes zinc-containing suspensions of ACTH prepared in accordance with the method of the U.S. Pat. No. 2,807,569 and characterized by the addition of an acid derived from an oxide of phosphorus or a derivative of this acid.

SUMMARY OF THE INVENTION

In accordance with the invention there are provided novel adsorption complexes which comprise a therapeutically acceptable compound of a metal which retards resorption of protein hormones and a peptide having adrenocorticotropic hormone activity, as well as injectable preparations comprising one or more of such adsorption complexes which exert an enhanced and prolonged ACTH activity.

The new adsorption complexes according to the invention, are composed of a carrier consisting of a pharmaceutically acceptable metal compound selected from a salt, hydroxide and oxide of a metal retarding the resorption of protein hormones, and one of the peptides with adrenocorticotropic hormone activity having the amino acid sequence of at least that of the first 19 and not more than that of the first 31 amino acid residues of the ACTH adsorbed on the carrier. By the term ACTH as further used in this specification is understood the main component of a mixture of compounds with adrenocorticotropic hormone activity as occurs in the pituitary gland of, e.g. man, pigs, cattle and sheep. The sequence of the amino acids of this main component for the said kinds of mammals is known. This component consists in all cases of 39-amino acid residues. The sequence 1 – 24, as from the N-terminal amino acid, serine, is identical for the various kinds of mammals. However, in the sequence 25 – 32 differences are seen as regards the composition and sequence of the amino acids, which differences have not proved to be of essential importance for the biological activity of the ACTH. We refer to the literature for elucidation of the structure of the ACTH-molecules from different species. See, e.g. T. H. Lee et al., J. Biol. Chem. 236, 2970 (1961) and R. G. Shepherd et al., J. Am. Chem. Soc. 78, 5069 (1956).

Injectable preparations may be made consisting of a suspension of said insoluble or sparingly soluble adsorption complexes in an aqueous injectable vehicle, the pH of said suspensions being between about 6.0 and 8.0. They have a prolonged and enhanced ACTH activity. Both the sparingly soluble adsorption complexes according to the invention and the injectable preparations are new.

By peptides with ACTH activity, serving as a component in the adsorption complexes of the invention, are understood the free peptides and their functional derivatives. The latter comprise amides and hydrazides, substituted or not, and derived from the carboxylic group of the fifth and the C-terminal amino acid residue, further, esters derived from aliphatic, aromatic or aralipathic alcohols such as methanol, ethanol and benzyl alcohol, alkali salts and acid addition salts of the peptides, derived from carboxylic acids, such as citric acid, succinic acid, malic acid, malonic acid, tartaric acid, glutaminic acid, tannic acid, acetic acid, propionic acid and inorganic acids, e.g. hydrochloric acid and phosphoric acid.

As examples of the peptides used there may be mentioned peptides with ACTH activity having the sequence of the first 19, 20, 24, 26, 28 and 31 amino acid residues respectively used in the following examples for the preparation of injectable drugs. All basic amino acids in the ACTH molecule reside in the sequence 6 – 21 unlike the acid amino acids. The majority of the latter occur in the sequence 25 – 39. Consequently peptides with sequences from 1 – 18 to 1 – 31 show a higher iso-electric point than the ACTH molecule containing 39 amino acid residues. Moreover these peptides with ACTH activity show an increased solubility at about pH 6 – 8. As they have properties differing physically and chemically from the ACTH molecule, it is surprising that the basic peptides with ACTH activity form adsorption complexes with the metal compounds mentioned, which are sparingly soluble or insoluble at about pH 6 – 8 and that the resulting adsorption complexes show an enhanced and prolonged activity compared with ACTH.

Apparently the basic amino acid residues play an important role in the formation of the sparingly soluble metal adsorption complexes. The prolonged activity of the metal complexes of the said peptides appeared to be more pronounced when complexes have been used with the smaller peptides. Therefore the use of peptides with ACTH activity having the amino acid sequence of 1 – 19 to 1 – 24 is preferred. In the structure having the amino acid sequence 1–24, the metal adsorption complex, for example the zinc complex, may contain a weight proportion of zinc to the tetracosapeptide from about 90 to about 1,800 gram equivalent of zinc per gram mol of tetracosapeptide, which corresponds to the limits of 1 – 20 mg zinc per 100 U.S.P. units of 1–24 ACTH, as set forth below. In a preferred form, the zinc complex may contain a weight proportion of zinc to the tetracosapeptide from about 180 to about 720 gram equivalent of zinc per gram mol of tetracosapeptide, which corresponds to the preferred limits of 2 – 8 mg per 100 U.S.P. units of 1–24 ACTH, as also set forth below. An illustration is found in the pharmacological results given in the accompanying examples. Moreover by administration of preparations manufactured from these smaller peptides to man, foreign peptides are prevented from being injected, which latter may be harmful after prolonged administration.

The peptides with ACTH activity used may be prepared by enzymatic decomposition of ACTH (see Shepherd et al., J. Am. Chem. Soc. 78, 5,051 (1956). They may also be prepared by synthesis, for example, by the method described by H. Kappeler and R. Schwyzer in Helv. Chim. Acta 44, 1,136 (1961). A synthesis of the 20-peptide has been described by K. Hoffman et al. in J. Am. Chem. Soc. 84, 4,481 (1962). This peptide has been prepared in the form of its amide and is used as such in Example VII. The synthesis of the 19-peptide has been described by C. H. Li in J. Am. Chem. Soc. 82, 5,760 (1960). The following peptides with ACTH activity were prepared:

a. sequence 1 – 31, by decomposition with pepsin
b. sequence 1 – 28, by decomposition with pepsin and carboxypeptidase A
c. sequence 1 – 26, by decomposition of esterified ACTH with pepsin, followed by the action of carboxypeptidase A and saponification
d. sequence 1 – 24, by decomposition of the 26-peptide with carboxypeptidase B
e. sequence 1 – 24, by synthesis
f. sequence 1 – 20, by synthesis
g. sequence 1 – 19, by synthesis.

In the ascorbic acid depletion test (see U.S.P. XVI) the following biological potencies with the mentioned fiducial limits for $P = 0.05$ were found after subcutaneous injection:

a. 31-peptide 148 (127–172) U.S.P. U/mg.
b. 28-peptide 100 ( 78–129) " "
c. 26-peptide 99 ( 69–142) " "
d. 24-peptide 61 ( 51–72) " "
e. 24-peptide 101 (85–120) " "
f. 20-peptide 73 ( 59–90) " ", and
g. 19-peptide 45 (34–59) ( 85–120) " "

The adsorption complexes of the invention are composed of a carrier consisting of a sparingly soluble salt, hydroxide or oxide of one or more of the indicated metals and the peptide having ACTH activity adsorbed on this carrier as an active constituent. Such a complex may be designated by the name "adsorption complex."

The metals most suitable for the product and process according to the invention are zinc, nickel, cobalt, copper and iron. Also mixtures thereof can be applied. For preference the physiological metal, zinc, is used and advantageously in the form of its hydroxide, oxide, phosphate or a mixture thereof. The order in which the peptide, the metal compound and the medium are combined is not of essential importance.

The adsorption complex can be isolated from the reaction mixture by centrifugation or filtration and resuspended at the desired time in a pharmaceutically suitable aqueous medium, or it may directly be formed in such a medium, so that the reaction mixture itself can be used as an injection preparation. Commonly an aqueous solution is made of the peptide with ACTH activity, to which an aqueous solution of a metal salt is added, whereupon the pH is adjusted at the desired value by means of e.g., sodium phosphate and/or a sodium hydroxide solution. At a pH of about 6 – 8 a suspension of an adsorption complex is formed consisting of the peptide with ACTH activity adsorbed at the metal compound, e.g. zinc phosphate or zinc hydroxide, formed at this pH. Finally the suspension obtained is diluted to a volume containing the desired amount of units, e.g. 30 U.S.P. U/ml. If the preparation is desired in the form of a solution, a soluble metal compound is taken as starting material, the pH of which is adjusted at a value at which the metal remains in solution. After injection of such a preparation a sparingly soluble or insoluble adsorption complex is formed at the site of the injection by the buffering action of the body fluid. These preparations are also new and an object of the invention.

It has been found that the use of an amount of metal of 1 – 20 mg. per 100 U.S.P. units has a very favorable influence on the activity of the peptides with ACTH activity. Preferably 2 – 8 mg. of metal are used per 100 U.S.P. units.

By preference an aqueous medium is applied containing a preservative, for example, a phenol, benzyl alcohol or a p-hydroxybenzoic acid ester, a compound to render the preparation isotonic, for example, sodium chloride, and a buffer to maintain the pH at the desired value, for example, an acetate or phosphate buffer.

Further it has been found that the stability and keeping qualities of the preparations according to the invention are improved by the addition of an acid derived from an oxide of phosphorus or a derivative of this acid in a quantity of about 0.05 – 0.70 mg. equivalent $PO_4$ per mg. equivalent zinc. As examples of such oxy acids of phosphorus are mentioned metaphosphoric acid, phosphorous acid, orthophosphoric acid, pyrophosphoric acid and tripolyphosphoric acid. By derivatives of these acids are understood pharmaceutically suitable inorganic salts of these acids, esters thereof derived from organic hydroxy compounds such as nucleosides, carbohydrates, polyalcohols and hydroxy amino acids and suitable inorganic salts of these esters. As examples of salts and esters of oxy acids of phosphorus are mentioned primary, secondary and tertiary sodium-, potassium- and ammonium salts, glycerophosphates, fructose-, ribose- and glucose phosphates and nucleoside phosphates such as adenosine mono-, di- and triphosphate, cytidine phosphates and phosphoserine as well as phosphamides, e.g. a creatine phosphate.

The pharmacological test with which the prolonged activity of the preparations according to the invention has been determined is based on the ascorbic acid depletion test, originally described in Endocrinology 42, 379 (1948). Instead of an intravenous injection a subcutaneous injection is given to a group of eight rats of 3 U.S.P. U. in the form of an adsorption complex with, e.g., zinc hydroxide. Another group of eight rats is given, also subcutaneously, 3 U.S.P. U. of an ACTH standard preparation without zinc hydroxide. After 24 hours the ascorbic acid content of the left and right adrenals together is determined of each rat of the two groups. The difference between the average ascorbic acid contents of the adrenals of the two groups serves as a criterion for the prolonged activity (cf. British Pharmacopoea 1958, addendum 1960, p. 21). By way of example, in this test the very high ascorbic acid depletion of 331 $\mu$g per 100 mg. of adrenal was observed with a preparation made from a synthetic peptide with ACTH activity of the sequence 1 – 24 and zinc hydroxide as the metal compound.

The present preparations have been tested clinically, see Examples VII and IX. The results of these tests confirm the favorable outcome of the pharmacological tests.

DESCRIPTION OF THE PREFERRED EMBODIMENTS

In the following examples the manufacture and composition of several preparations containing peptides with ACTH activity are described and their prolonged activity is indicated.

EXAMPLE I

Of the 31-peptide of a potency of 148 USP/U mg. 22.7 mg. are dissolved in 2 ml. of water. Next 3.4 ml. of a zinc chloride solution, containing 43.9 mg. of zinc per ml. are added and 2 ml. of a solution of secondary sodium-phosphate, containing 63.2 mg. of $Na_2HPO_4$ 12 aq. per ml. The total volume of the solution is completed to 10 ml. with distilled water. Next this solution is added dropwise, while stirring, to 25 ml. of solvent of the following composition: 2 percent (w/v.) benzyl alcohol and 1.2 percent by weight of sodium chloride. At the same time a solution of 0.5 N sodium hydroxide is added dropwise, maintaining the pH at 8.0. The total amount of alkali required amounts to 5.3 ml.

Finally the volume was completed with distilled water to 50 ml. The composition of the thus obtained suspension is:

| 31-peptide | 60 | USP U/ml. |
|---|---|---|
| zinc | 3 | mg./ml. |
| $Na_2HPO_4$ | 1.0 | mg./ml. |
| benzyl alcohol | 10 | mg./ml. |
| sodium chloride | 9.0 | mg./ml. |
| pH | 8.0 | |

In the prolonged activity test an average ascorbic acid depletion was found of 202 $\mu$g per 100 mg. of adrenal, which indicates a very good prolonged activity.

Corresponding preparations were prepared in the same manner, using cobalt and iron instead of zinc. They also showed a prolonged activity in the test mentioned.

EXAMPLE II

In the manner of Example I a suspension was prepared with the 28-peptide with ACTH activity of the following composition:

| 28-peptide (100 USP U/mg.) | 30 | USP U/ml. |
|---|---|---|
| zinc (added as zinc chloride) | 1.75 | mg./ml. |
| $Na_2HPO_4$ | 0.58 | mg./ml. |
| benzyl alcohol | 10 | mg./ml. |
| sodium chloride | 8.5 | mg./ml. |
| pH | 8.0 | |

In the test for prolonged activity a response of 240 $\mu$g per 100 mg. of adrenal was found.

EXAMPLE III

By the method of Example I a suspension was prepared of the 24-peptide with ACTH activity of the following composition:

| | | |
|---|---|---|
| 24-peptide (61 USP U/mg.) | 30 | USP U/ml. |
| zinc (added as zinc chloride) | 1.75 | mg./ml. |
| Na$_2$HPO$_4$ | 0.58 | mg./ml. |
| benzyl alcohol | 10 | mg./ml. |
| sodium chloride | 8.8 | mg./ml. |
| pH | 8.0 | |

In the ascorbic acid depletion test the very high response of 347 μg per 100 mg. of adrenal was found.

EXAMPLE IV

By the process described above a suspension was prepared of the following composition:

| | | |
|---|---|---|
| 31-peptide (106 USP U/mg.) | 60 | USP U/mg. |
| zinc (added as zinc chloride) | 3 | mg./ml. |
| benzyl alcohol | 10 | mg./ml. |
| sodium chloride | 9.1 | mg./ml. |
| pH | 8.0 | |

In the ascorbic acid depletion test a response was measured of 192 μg per 100 mg. of adrenal.

EXAMPLE V

In the manner described above a suspension was prepared of the following composition:

| | | |
|---|---|---|
| 26-peptide (99 USP U/mg.) | 60 | USP U/ml. |
| zinc (added as zinc chloride) | 2.5 | mg./ml. |
| benzyl alcohol | 10 | mg./ml. |
| sodium chloride | 9.3 | mg./ml. |
| pH | 7.5 | |

In the test for prolonged activity this preparation showed an ascorbic acid depletion of 182 μg per 100 mg. of adrenal.

EXAMPLE VI

By the method of Example I a suspension having the following composition was prepared:

| | | |
|---|---|---|
| 19-peptide (45 USP U/mg.) | 40 | USP U/ml. |
| zinc (added as zinc acetate) | 2 | mg./ml. |
| Na$_2$HPO$_4$ | 0.66 | mg./ml. |
| benzyl alcohol | 10 | mg./ml. |
| sodium chloride | 9.2 | mg./ml. |
| pH | 8.0 | |

This preparation gave in the test on prolonged activity a response of 293 μg per 100 mg. of adrenal.

EXAMPLE VII

In the manner described above a suspension having the following composition was prepared:

| | | |
|---|---|---|
| 20-peptide (73 USP U/mg.) | 60 | USP U/ml. |
| zinc (added as zinc sulfate) | 3 | mg./ml. |
| Na$_2$HPO$_4$ | 1.0 | mg./ml. |
| benzyl alcohol | 10 | mg./ml. |
| sodium chloride | 9.3 | mg./ml. |
| pH | 7.8 | |

The ascorbic acid depletion in the test on prolonged activity was 312 μg per 100 mg. of adrenal.

This preparation was tested clinically on seven patients in a dose of 60 USP U. Eosinophil counts in the blood were made every four hours; the percentage of eosinophils were calculated for each patient and the median value calculated. Decrease in eosinophil count and restoration of the blood picture to that found at the beginning of the experiment permit the determination of the prolonged activity of the preparation. The following median eosinophil values were found:

| Time (hours) | Injection 0 | 4 | 8 | 12 | 16 | 20 | 24 |
|---|---|---|---|---|---|---|---|
| Values | 100 | 91 | 43 | 38 | 36 | 84 | 102 |

A preparation of a similar composition, but containing the same amount of commercial ACTH gave the following eosinophil response:

| Time (hours) | Injection 0 | 4 | 8 | 12 | 16 | 20 | 24 |
|---|---|---|---|---|---|---|---|
| Values | 100 | 50 | 25 | 50 | 87 | 102 | 101 |

From these figures it is clear that the activity of the first preparation is more prolonged.

EXAMPLE VIII 14.8 mg. of a synthetic 24-peptide with ACTH activity having a potency of 101 USP U/mg. are dissolved in 5 ml. acidified water (pH 3.0).

4.7 ml. of a zinc chloride solution, containing 21.4 mg. zinc per ml. are added. The total volume is adjusted with water to 20 ml. To this solution 20 ml. of a solution containing 12.5 mg. of phenol per ml. and 15 mg. sodium chloride per ml. are added. While stirring the pH is adjusted to 7.6, by dropwise addition of 4.8 ml. 0.5 normal sodium hydroxide (carbonate free). The volume is adjusted with water to 50 ml.

The composition of the suspension prepared in this way is:

| | | |
|---|---|---|
| 24-peptide | 40 | USP U/ml. |
| zinc | 2 | mg. Zn./ml. |
| phenol | 5 | mg./ml. |
| sodium chloride | 8.8 | mg./ml. |
| pH | 7.6 | |

In this preparation the zinc is mainly present as a basic salt with the formula $ZnCl_2 \cdot x\ Zn(OH)_2$.

This preparation gave the ascorbic acid depletion of 267 μg per 100 mg. of adrenal in the test on prolonged action.

EXAMPLE IX

A suspension was prepared according to Example I, having the following composition:

| | | |
|---|---|---|
| 24-peptide (101 USP U/mg.) | 30 | USP U/ml. |
| zinc | 1.75 | mg./ml. |
| Na$_2$HPO$_4$ | 0.58 | mg./ml. |
| benzyl alcohol | 10 | mg./ml. |
| pH | 8.0 | |

In the ascorbic acid depletion test a response of 287 μg per 100 mg. adrenal was found.

This preparation was tested clinically on seven patients in a dose of 60 USP U. The 24 hours 17 OH corticoid excretion in urine was determined according to C. C. Porter and R. H. Silver, J. Biol. Chem. 185, 201 (1950) on four consecutive days. In the following table the figures indicate the 17-hydroxy corticoid excretion in mg./24 hours.

| | day injection of 60 USP U | | | |
|---|---|---|---|---|
| patient | 1 | 2 | 3 | 4 |
| 1 | 6.5 | 22.2 | 5.8 | 4.7 |
| 2 | 8.1 | 29.6 | 15.1 | 8.3 |
| 3 | 6.4 | 26.7 | 9.7 | 5.0 |
| 4 | 10.9 | 33.3 | 13.3 | 8.0 |
| 5 | 9.4 | 39.2 | 9.2 | 9.6 |
| 6 | 8.0 | 43.9 | 17.5 | 6.4 |
| 7 | 7.2 | 24.9 | 9.4 | 2.8 |

All seven patients reacted on the day of injection. In four out of seven patients a clear response is seen even on the second day after injection.

EXAMPLE X

A suspension was prepared in the manner described above having the following composition:

| | | |
|---|---|---|
| 31-peptide (148 USP U/mg.) | 30 | USP/ml. |
| NiSO$_4$ | 2 | mg. Ni/ml. |
| Na$_3$PO$_4$ | 2.3 | mg./ml. |
| phenol | 0.5 | mg./ml. |
| NaCl | 8.9 | mg./ml. |
| NaOH | pH 7.0 | |

The test for prolonged activity indicated a considerable prolonged action.

EXAMPLE XI

By the process described above a suspension was prepared of the following composition:

| | | |
|---|---|---|
| 26-peptide (99 USP U/mg.) | 40 | USP U/ml. |
| CuSO$_4$ | 2 | mg. Cu/ml. |
| benzyl alcohol | 10 | mg./ml. |
| NaCl | 9.3 | mg./ml. |
| NaOH | pH 8.0 | |

An ascorbic depletion of 147 μg/100 mg. adrenal was measured in the test for prolonged action.

EXAMPLE XII

A suspension was prepared of the following composition:

| | | |
|---|---|---|
| 20-peptide | 30 | USP U/ml. |
| CoSO$_4$ | 1.5 | mg. Co/ml. |
| Na$_3$PO$_4$ | 2.8 | mg./ml. |
| glycerol | 2.4 | mg./ml. |
| phenol | 0.5 | mg./ml. |
| pH | 6.4 | |

The test for prolongation indicated an ascorbic acid depletion of 155 μg/100 mg. adrenal.

EXAMPLE XIII

A suspension was prepared of the following composition:

| | | |
|---|---|---|
| 24-peptide | 60 | USP U/ml. |
| ferriacetate | 3.5 | mg. Fe/ml. |
| NaCl | 9.0 | mg./ml. |
| methylparaben | 0.85 | mg./ml. |
| propylparaben | 0.15 | mg./ml. |
| NaOH | pH 6.5 | |

The ascorbic acid depletion was 173 μg/100 mg. adrenal.

EXAMPLE XIV

A suspension was prepared of the following composition:

| | | |
|---|---|---|
| 19-peptide (45 USP U/mg.) | 40 | USP U/ml. |
| ZnCl$_2$ | 2 | mg. Zn/ml. |
| Na$_3$PO$_4$ | 3.3 | mg./ml. |
| phenol | 0.5 | mg./ml. |
| glycerol | 2.4 | mg./ml. |
| pH | 6.0 | |

The amount of ACTH activity present in the supernatant liquid after centrifugation was 0.36 USP U/ml. which proved that virtually all the activity was present in the adsorption complex.

EXAMPLE XV

According to Example VIII a suspension of the following composition was prepared. Instead of phenol, benzyl alcohol was used as a preservative.

| | | |
|---|---|---|
| 24-peptide (101 U/mg.) | 40 | USP U/ml. |
| zinc (added as ZnCl$_2$) | 1 | mg./ml. |
| benzyl alcohol | 10 | mg./ml. |
| sodium chloride | 9.1 | mg./ml. |
| pH | 7.8 | |

Under these conditions a sparingly soluble complex was formed. The ACTH activity of the supernatant was determined and amounted to 0.25 USP U/ml. This means that more than 99 percent of the activity was present in the adsorption complex. Moreover this preparation showed a considerable prolonged activity, since an ascorbic depletion of 321 μg/100 mg. of adrenal was found.

EXAMPLE XVI

A preparation having the following composition:

| | | |
|---|---|---|
| 1-24 peptide | 40 | USP U/ml. |
| zinc (added as ZnCl$_2$) | 4 | mg./ml. |
| benzyl alcohol | 10 | mg./ml. |
| sodium chloride | 9.1 | mg./ml. |
| pH | 4.0 | | was prepared

This preparation gave an ascorbic acid depletion of 137 μg/100 mg. adrenal in the test on prolonged activity.

What is claimed is:

1. An adsorption complex consisting of a pharmaceutically acceptable metal compound selected from the group consisting of a sparingly soluble or insoluble salt, hydroxide and oxide of a metal selected from the group consisting of zinc, nickel, cobalt, copper and iron, and $\alpha^1$ $^{to}$ $^n$-ACTH where $n$ is an integer from 19 to 31 inclusive, the amount of metal being between about 1 and about 20 mg. per 100 U.S.P. units of $\alpha^1$ $^{to}$ $^n$-ACTH.

2. The complex of claim 1 in which $n$ is an integer from 19 to 24 inclusive.

3. The complex of claim 1 in which the metal is zinc.

4. A complex consisting of $\alpha^{1-24}$-ACTH and a sparingly soluble zinc compound, the weight proportion of zinc to $\alpha^{1-24}$-ACTH being about 1 to about 20 mg. per 100 U.S.P. units of $\alpha^{1-24}$-ACTH.

5. A complex consisting of $\alpha^{1-24}$-ACTH and a sparingly soluble zinc compound, the weight proportion of zinc to $\alpha^{1-24}$-ACTH being about 2 to about 8 mg. per 100 U.S.P. units of $\alpha^{1-24}$.

* * * * *

UNITED STATES PATENT OFFICE
CERTIFICATE OF CORRECTION

Patent No. 3,678,027  Dated July 18, 1972

Inventor(s) Evert De Jager; Jan Daniel Herman Homan

It is certified that error appears in the above-identified patent and that said Letters Patent are hereby corrected as shown below:

Claim 5, last line, (column 8, line 56), after "$\alpha^{1-24}$", delete the 5 asteriks and insert --ACTH--.

Signed and sealed this 24th day of October 1972.

(SEAL)
Attest:

EDWARD M. FLETCHER, JR.
Attesting Officer

ROBERT GOTTSCHALK
Commissioner of Patents